(12) United States Patent
Kobayashi

(10) Patent No.: US 11,458,775 B2
(45) Date of Patent: Oct. 4, 2022

(54) PNEUMATIC TYRE, TYRE MOLD AND METHOD FOR MANUFACTURING PNEUMATIC TYRE USING THE SAME

(71) Applicant: Sumitomo Rubber Industries, Ltd., Kobe (JP)

(72) Inventor: Tatsuya Kobayashi, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 191 days.

(21) Appl. No.: 16/776,025

(22) Filed: Jan. 29, 2020

(65) Prior Publication Data

US 2020/0262248 A1 Aug. 20, 2020

(30) Foreign Application Priority Data

Feb. 18, 2019 (JP) ............................. JP2019-026713

(51) Int. Cl.
 *B60C 11/01* (2006.01)
 *B60C 11/12* (2006.01)
 (Continued)

(52) U.S. Cl.
 CPC ...... *B60C 11/1272* (2013.01); *B29D 30/0629* (2013.01); *B60C 11/1204* (2013.01);
 (Continued)

(58) Field of Classification Search
 CPC ............. B60C 11/1236; B60C 11/1204; B60C 11/1281; B60C 2011/0381;
 (Continued)

(56) References Cited

U.S. PATENT DOCUMENTS 2,186,180 A * 1/1940 Sloman .................. B60C 11/12
152/DIG. 3
5,733,393 A * 3/1998 Hubbell ................. B60C 11/00
152/209.15
(Continued)

FOREIGN PATENT DOCUMENTS

DE  11 2015 002 092 T5   2/2017
EP      1 964 691 A1     9/2008
(Continued)

OTHER PUBLICATIONS

Machine translation for Japan 63-312204 (Year: 2021).*
(Continued)

*Primary Examiner* — Steven D Maki

(57) ABSTRACT

A pneumatic tyre includes a tread portion being provided with a land portion divided by a main groove extending continuously in a tyre circumferential direction. The land portion is provided with two or more sipes having a width less than 1.5 mm on a ground contacting surface of the land portion and two or more groove elements having a width equal to or more than 1.5 mm on the ground contacting surface. Lengths in a tyre axial direction of the groove elements are equal to or less than 15% of a maximum width in the tyre axial direction of the ground contacting surface of the land portion, and at least one of the sipes is in communication with one of the groove elements.

18 Claims, 8 Drawing Sheets

(51) Int. Cl.
    *B29D 30/06*      (2006.01)
    *B60C 11/03*      (2006.01)

(52) U.S. Cl.
    CPC ...... *B60C 11/1236* (2013.01); *B60C 11/1281* (2013.01); *B29D 2030/0613* (2013.01); *B60C 2011/013* (2013.01); *B60C 2011/036* (2013.01); *B60C 2011/0348* (2013.01); *B60C 2011/0365* (2013.01); *B60C 2011/0381* (2013.01); *B60C 2011/1209* (2013.01)

(58) Field of Classification Search
    CPC ....... B60C 2011/013; B60C 2011/0348; B60C 2011/1209; B29D 2030/0613
    See application file for complete search history.

(56) References Cited

U.S. PATENT DOCUMENTS

| | | | | |
|---|---|---|---|---|
| 5,804,000 | A * | 9/1998 | Shirai | B60C 11/0306 |
| | | | | 152/209.15 |
| 2001/0022209 | A1 * | 9/2001 | Chaen | B60C 11/12 |
| | | | | 152/151 |
| 2009/0272474 | A1 * | 11/2009 | Nagai | B60C 11/032 |
| | | | | 152/209.18 |
| 2011/0041972 | A1 * | 2/2011 | Kageyama | B60C 11/12 |
| | | | | 152/209.15 |
| 2013/0167996 | A1 | 7/2013 | Oda | |
| 2017/0210175 | A1 * | 7/2017 | Yoshimura | B60C 11/12 |

FOREIGN PATENT DOCUMENTS

| | | | |
|---|---|---|---|
| EP | 3 208 111 A1 | | 8/2017 |
| EP | 3378678 A1 | * | 9/2018 |
| JP | 63-312204 A | * | 12/1988 |
| JP | 03-157209 A | * | 7/1991 |
| JP | 2004-98938 A | | 4/2004 |
| JP | 2007-223493 A | * | 9/2007 |
| JP | 2013-139194 A | | 7/2013 |
| JP | 2014-97725 A | | 5/2014 |

OTHER PUBLICATIONS

Machine translation for Japan 2007-223493 (Year: 2022).*
Machine translation for Japan 03-157209 (Year: 2022).*
Extended European Search Report for European Application No. 19214974.8, dated Jun. 12, 2020.

* cited by examiner

PNEUMATIC TYRE, TYRE MOLD AND METHOD FOR MANUFACTURING PNEUMATIC TYRE USING THE SAME

BACKGROUND ART

Field of the Disclosure

The present disclosure relates to a pneumatic tyre, a tyre mold, and a method for manufacturing a pneumatic tyre using the tyre mold.

Description of the Related Art

The following patent document 1 discloses a pneumatic tyre including a shoulder land portion disposed between a shoulder main groove and a tread edge. The shoulder land portion is provided with shoulder lateral grooves extending toward the tyre equator from the tread edge and shoulder lateral sipes extending to the shoulder main groove from axially inner ends of the shoulder lateral grooves.

PATENT DOCUMENT

[Patent document 1] Japanese Unexamined Patent Application Publication 2013-139194

SUMMARY OF THE DISCLOSURE

The pneumatic tyre disclosed in Patent document 1 exhibits better braking performance on wet road conditions, but there has been room for improvement in noise performance.

The present disclosure has been made in view of the above problem and has a major object to provide a pneumatic tyre capable of improving noise performance while preventing reduction in wet braking performance, a tyre mold, and a method for manufacturing a pneumatic tyre using the tyre mold.

In one aspect of the present disclosure, a pneumatic tyre includes a tread portion being provided with a land portion divided by a main groove extending continuously in a tyre circumferential direction, wherein the land portion is provided with two or more sipes having a width less than 1.5 mm on a ground contacting surface of the land portion and two or more groove elements having a width equal to or more than 1.5 mm on the ground contacting surface, lengths in a tyre axial direction of the groove elements are equal to or less than 15% of a maximum width in the tyre axial direction of the ground contacting surface of the land portion, and at least one of the sipes is in communication with one of the groove elements.

In another aspect of the disclosure, the land portion may be a shoulder land portion including a tread edge.

In another aspect of the disclosure, the lengths in the tyre axial direction of the groove elements may be smaller than lengths in the tyre axial direction of the sipes.

In another aspect of the disclosure, the sipes may include at least one first sipe extending toward a tread edge, the groove elements may include at least one first groove element in communication with the at least one first sipe, and the at least one first groove element may be arranged on the tread edge.

In another aspect of the disclosure, the at least one first groove element may have an inner end in the tyre axial direction, and a distance in the tyre axial direction between the inner end and the tread edge may be equal to or less than 5 mm.

In another aspect of the disclosure, the groove elements may include at least one second groove element arranged inwardly in the tyre axial direction of the at least one first groove element, and the sipes may include at least one second sipe extending in the tyre axial direction and being in communication with the at least one second groove element.

In another aspect of the disclosure, the sipes may include at least one third sipe extending in the tyre circumferential direction, and the at least one second groove element may be in communication with the at least one third sipe.

In another aspect of the disclosure, the sipes may include at least one third sipe extending in the tyre circumferential direction, and the at least one first sipe may be in communication with the at least one third sipe.

In another aspect of the disclosure, the sipes may include at least one fourth sipe extending inwardly in the tyre axial direction from the at least one third sipe, and the at least one fourth sipe may be bent on the ground contacting surface of the land portion.

In another aspect of the disclosure, the land portion may be a shoulder land portion including the tread edge, wherein the shoulder land portion may include a buttress portion extending inwardly in a tyre radial direction from the tread edge, the buttress portion may be provided with two or more recesses having a width equal to or more than 1.5 mm on a buttress surface, and at least one of the first sipe may be in communication with either one of the recesses.

In another aspect of the disclosure, the sipes may include a chamfered portion.

In another aspect of the disclosure, a tyre mold for manufacturing either one of the above-mentioned pneumatic tyre, the tyre mold includes a tread molding surface for molding an outer surface of the tread portion, the tread molding surface including a reference surface for molding the ground contacting surface, protrusions protruding from the reference surface for molding the groove elements, and blades embedded in the reference surface, wherein the blades include fixed portions fixed to the protrusions.

In another aspect of the disclosure, a method for manufacturing a pneumatic tyre using the above-mentioned tyre mold, the method includes forming a raw tyre, and vulcanizing the raw tyre using the tyre mold.

DESCRIPTION OF THE PREFERRED EMBODIMENTS

An embodiment of the present disclosure will be explained below with reference to the accompanying drawings.

Figure 1:
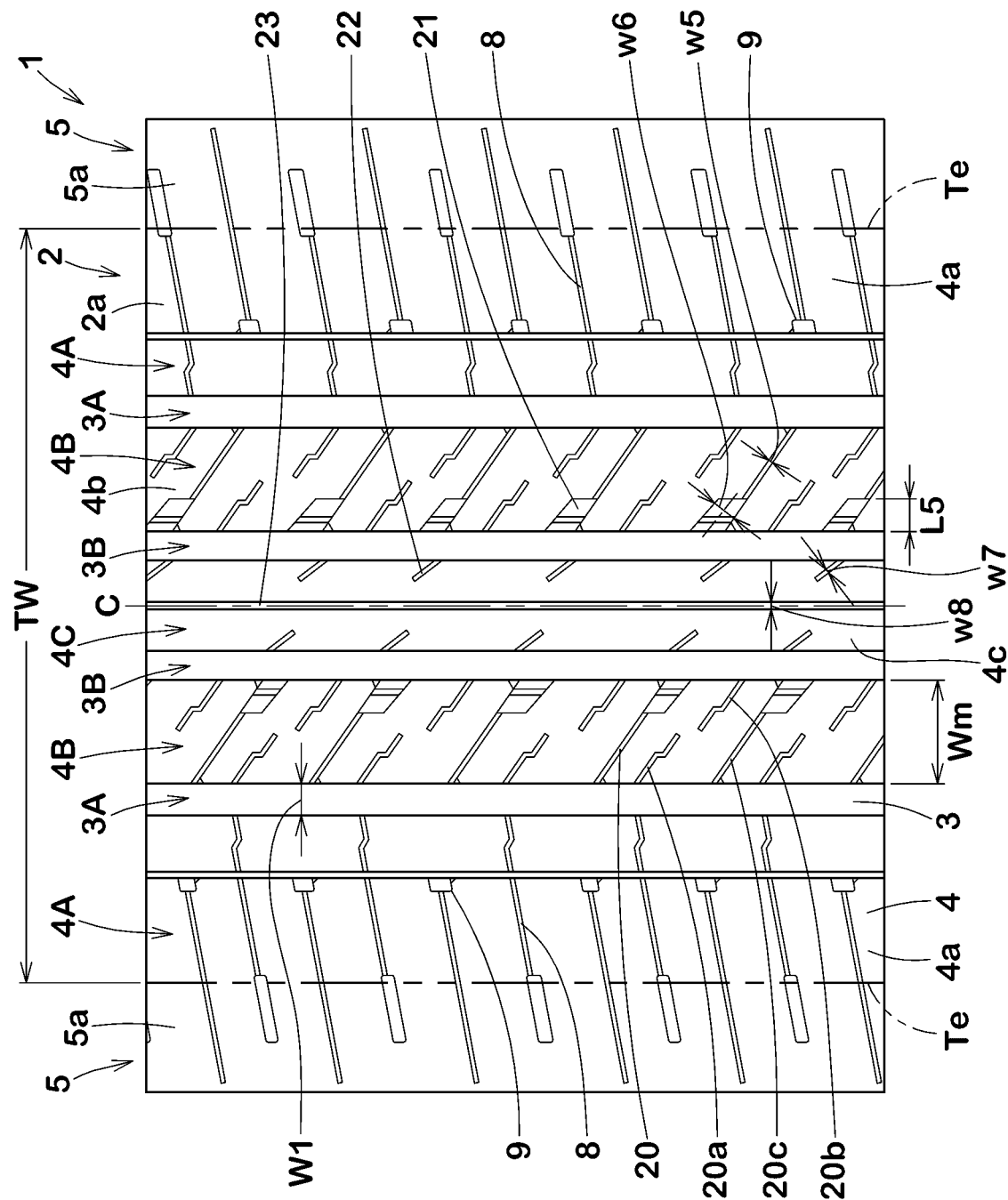
FIG. 1 is a development view of a tread portion according to an embodiment of the present disclosure.

FIG. 1 illustrates a development view of a tread portion 2 of a pneumatic tyre (hereinafter may be simply referred to as "tyre") 1.

As a preferred embodiment, FIG. 1 shows the tread portion 2 for passenger car. Note that the present disclosure may be embodied in various types of tyres such as a heavy-duty tyre and the like, for example.

As illustrated in FIG. 1, the tread portion 2 according to the present embodiment includes at least one land portion 4 divided by at least one main groove 3 extending continuously in the tyre circumferential direction.

The at least one main groove 3, for example, includes two shoulder main grooves 3A arranged proximate to respective tread edges Te, and two crown main grooves 3B arranged between the shoulder main grooves 3A such that the tyre equator C is disposed therebetween. Note that the at least one main groove 3 is not limited to the above aspect.

The tread edges Te are the axial outermost edges of the ground contacting surface 2a of the tyre 1 which occurs under a normal condition with a standard tyre load when the camber angle of the tyre is zero.

As used herein, the "normal condition" is such that the tyre 1 is mounted onto a standard wheel rim (not illustrated) with a standard pressure but loaded with no tyre load. Under the normal condition, an axial distance between the tread edges Te is defined as the tread width TW. As used herein, unless otherwise noted, dimensions of respective portions of the tyre 1 are values measured under the normal condition.

The "standard wheel rim" is a wheel rim officially approved for each tyre by standards organizations on which the tyre is based, wherein the standard wheel rim is the "standard rim" specified in JATMA, the "Design Rim" in TRA, and the "Measuring Rim" in ETRTO, for example.

The "standard pressure" is a standard pressure officially approved for each tyre by standards organizations on which the tyre is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example. When the tyre 1 is for a passenger car, the standard pressure is defined as 180 kPa.

The standard tyre load is a tyre load officially approved for each tyre by standards organizations in which the tyre is based, wherein the standard tyre load is the "maximum load capacity" in JATMA, the maximum value given in the above-mentioned table in TRA, the "Load Capacity" in ETRTO, for example. When the tyre 1 is for a passenger car, the standard tyre load is defined as load corresponding to 88% of the above-mentioned load.

In the present embodiment, the main grooves 3A and 3B extend in a straight shape. Alternatively, the main grooves 3A and 3B may extend in a zigzag or wavy manner. Although a groove width W1 of the main grooves 3A and 3B is not limited, the groove width W1 is preferably in a range of from 2% to 9% of the tread width TW, for example. Further, a groove depth of the main grooves 3A and 3B (not illustrated), for example, is preferably of from about 5 to 16 mm.

The at least one land portion 4 according to the present embodiment includes two shoulder land portions 4A, two middle land portions 4B and one crown land portion 4C delimited by two shoulder main grooves 3A and two crown main grooves 3B.

The tyre 1 further includes two axially spaced buttress portions 5 extending inwardly in the tyre radial direction from the respective tread edges Te. Each buttress portion 5 includes a buttress surface 5a in communication with a ground contacting surface 4a of a respective one of the shoulder land portions 4A through the tread edge Te.

Figure 2:
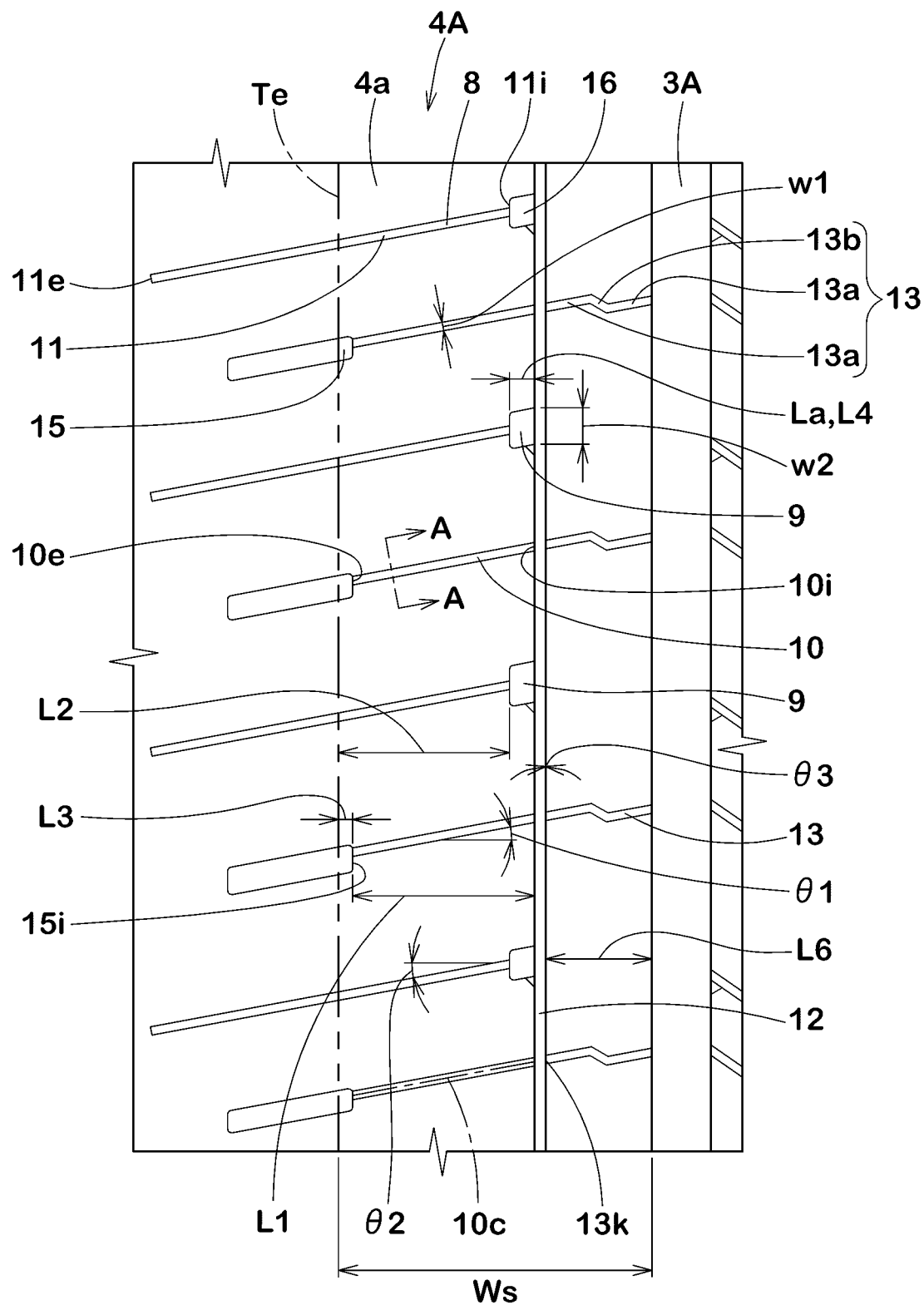
FIG. 2 is an enlarged view of a shoulder land portion of FIG. 1.

FIG. 2 illustrates a partial enlarged view of one of the shoulder land portion 4A. As illustrated in FIG. 2, the shoulder land portion 4A is provided with two or more sipes 8 having a widths w1 less than 1.5 mm on the ground contacting surface 4a and two or more groove elements 9 having a width w2 equal to or more than 1.5 mm on the ground contacting surface 4a. The sipes 8 and the groove elements 9 may mitigate stiffness of the shoulder land portion 4A, and thus impact noise when the shoulder land portion 4A comes into contact with the ground can be reduced, improving noise performance. In addition, the sipes 8 and the groove elements 9 may scratch the ground so as to discharge water from the ground contacting surface 4a, improving wet braking performance.

Lengths La in the tyre axial direction of all the groove elements 9 which are provided on the shoulder land portion 4A are equal to or less than 15% of the maximum width Ws in the tyre axial direction of the ground contacting surface 4a of the shoulder land portion 4A. Such short groove elements 9 with small groove volume may enable less pumping noise upon grounding. In order to further reduce pumping noise upon grounding, it is preferable that the lengths La of the groove elements 9 are equal to or less than 10% of the maximum width Ws of the ground contacting surface 4a.

The sipes 8 according to the present embodiment include one or more first sipes 10, one or more second sipes 11, one third sipe 12 and one or more fourth sipes 13.

The groove elements 9 according to the present embodiment include one or more first groove elements 15, and one or more second groove elements 16 arranged inwardly in the tyre axial direction of the first groove elements 15.

The first sipes 10 and the second sipes 11, for example, extend toward the tread edge Te. The first sipes 10 and the second sipes 11, in the present embodiment, extend in a straight shape with a small angle with respect to the tyre axial direction. Thus, sipe edges of the first sipes 10 and the second sipes 11 can scratch the ground so as to discharge water from the ground contacting surface 4a effectively. Although it is not particularly limited, an angle θ1 and an angle θ2 of the first sipes 10 and the second sipes 11, respectively, are preferably equal to or less than 10 degrees, more preferably equal to or less than 5 degrees. In the present embodiment, an absolute value of the angle difference |θ2−θ1| between the first sipes 10 and the second sipes 11 is equal to or less than 5 degrees.

Each first sipe 10, in the present embodiment, includes an axially inner end 10i located within the shoulder land portion 4A and an axially outer end lie located within the shoulder land portion 4A around the tread edge Te. Each second sipe 11, in the present embodiment, includes an axially inner end 11i located within the shoulder land portion 4A and an axially outer end the outer end lie located outwardly of the tread edge Te.

The third sipe 12 extends in the tyre circumferential direction. The third sipe 12, in cooperation with the axially extending first sipes 10 and the second sipes 11, mitigate stiffness in both axial and circumferential directions of the shoulder land portion 4A appropriately. The third sipe 12, for example, extend continuously in a straight shape. An angle θ3 of the third sipe 12, for example, is preferably equal to or more than 80 degrees, more preferably equal to or more than 85 degrees, further preferably 90 degrees with respect to the tyre axial direction.

The third sipe 12 according to the present embodiment is in communication with the first sipes 10. Thus, on the intersections of the third sipe 12 and the first sipes 10, stiffness in both axial and circumferential directions of the shoulder land portion 4A may be reduced appropriately further, enabling less impact noise upon grounding and promoting discharging water.

The fourth sipes 13 according to the present embodiment extend inwardly in the tyre axial direction from the third sipe 12. The fourth sipes 13, for example, extend so as to be bent on the ground contacting surface 4a. The fourth sipes 13 may mitigate effectively stiffness of the shoulder land portion 4A on the tyre equator C side which receives relatively large ground contact pressure upon straight driving, reducing impact noise. Each fourth sipe 13, in the present embodiment, includes a pair of outer portions 13a which is inclined in the same direction as with each other and a middle portion 13b which connects the pair of outer portions 13a while being inclined in an opposite direction with respect to the pair of outer portions 13a.

The fourth sipes 13, for example, are connected to the respective first sipes 10 in a straight manner at least at connected points thereof through the third sipe 12. Note that the "straight manner" is meant that the respective center lines 10c of the first sipes 10 intersect respective openings 13k of the fourth sipes 13 at the third sipe 12. In addition, the fourth sipes 13 according to the present embodiment are in communication with the shoulder main groove 3A. Thus, impact noise generated from intersections among the first sipes 10, the third sipe 12 and the fourth sipes 13 on the shoulder land portion 4A upon grounding can further be reduced.

Depths (not illustrated) of the first sipes 10, the second sipes 11, the third sipe 12 and the fourth sipes 13, for example, are preferable in a range of from about 3 to 7 mm. In addition, it is preferable that a depth of the fourth sipes 13 is smaller than that of the first sipes 10 and the third sipe 12. Thus, excessive reduction in stiffness of the shoulder land portion 4A on the tyre equator C side which receive large ground contact pressure upon straight driving can be prevented, improving wet braking performance.

Figure 3:
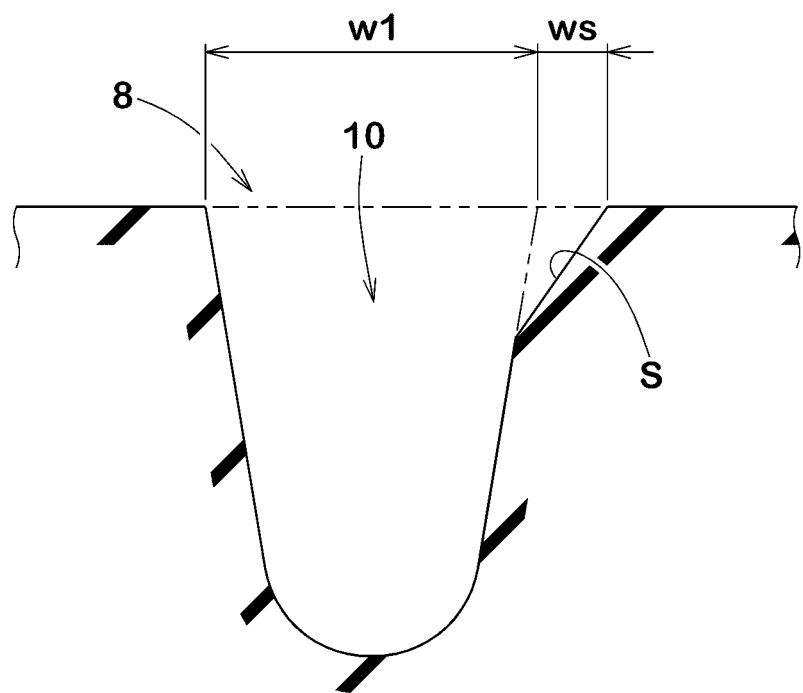
FIG. 3 is a cross-sectional view taken along line A-A of FIG. 2.

FIG. 3 illustrates a cross-sectional view taken along line A-A of FIG. 2. As illustrated in FIG. 3, each first sipe 10 includes a chamfered portion S. The chamfered portion S helps to reduce impact noise when each first sipe 10 comes into contact with the ground. Such a chamfered portion S, in the present embodiment, is provided on each second sipe 11 and each fourth sipe 13 (not illustrated). The chamfered portion S, for example, may be provided in the entire length on the ground contacting surface 4a of each sipe 10, 11 and 13. This feature helps to improve noise performance further. The chamfered portion S is provided on either one of sipe edges of each sipe 10, 11 and 13. Thus, the other sipe edge which is not provided with the chamfered portion S can scratch the ground effectively to discharge water, improving wet braking performance.

Although it is not particularly limited, a width ws of the chamfered portion S is preferably in a range of from 50% to 100% of a width w1 of each sipe 8 on which the chamfered portion S is to be provided. If the width ws of the chamfered portion S exceeds 100% of the width w1, there is a risk that wet braking performance deteriorates due to excessive reduction in stiffness of the shoulder land portion 4A.

Since the third sipe 12 extends in the tyre circumferential direction, the sipe edges come into contact with the ground gradually according when driving. Thus, impact noise generated by the third sipe 12 is small. In the present embodiment, the third sipe 12 extending in the tyre circumferential direction is not provided with the chamfered portion, and thus the pair of sipe edges can help to improve wet braking performance.

As illustrated in FIG. 2, the first groove elements 15 are in communication with the respective first sipes 10. Thus, stiffness of the shoulder land portion 4A can be mitigated further, reducing impact noise upon grounding. In addition, the first sipes 10 and the first groove elements 15 can open greatly, improving discharging water effectively.

Since the first groove elements 15 traverse the tread edge Te, pumping noise generated thereby may easily leak outside the tyre. In order to reduce pumping noise generated by the first groove elements 15, a length L3 in the tyre axial direction between the inner ends 15i of the first groove elements 15 and the tread edge Te is preferably equal to or less than 5 mm.

The first groove elements 15, in the present embodiment, extend from the shoulder land portion 4A to the buttress portion 5. Such first groove elements 15 can discharge water smoothly from the ground contacting surface 4a. The first groove elements 15, for example, extend in a straight manner. Alternatively, the first groove elements 15, for example, extend in a zigzag or wavy manner.

The second groove elements 16, in the present embodiment, are connected to the respective inner ends 11i of the second sipes 11, and terminate within the shoulder land portion 4A. Such second groove elements 16, as with the first groove elements 15, can mitigate stiffness of the shoulder land portion 4A, reducing impact noise upon grounding. Further, the second sipes 11 and the second groove elements 16 can open greatly, improving discharging water effectively. Furthermore, the second groove elements 16 which do not traverse the tread edge Te, as compared to the first groove elements 15, can prevent pumping noise from leaking outside the tyre 1. Thus, in view of ensuring better wet braking performance, a length L4 in the tyre axial direction of the second groove elements 16 is greater than the length L3 in the tyre axial direction of the first groove elements 15.

On the ground contacting surface 4a, a length L1 in the tyre axial direction of the first sipes 10 is preferably equal to or more than 6 times the length L3 in the tyre axial direction of the first groove elements 15. Similarly, on the ground contacting surface 4a, a length L2 in the tyre axial direction of the second sipes 11 is preferably equal to or more than 6 times the length L4 in the tyre axial direction of the second groove elements 16. Thus, wet braking performance and noise performance can be ensured in a well-balanced manner.

The second groove elements 16, for example, are connected to the third sipe 12. Thus, impact noise can be reduced further.

In the present embodiment, the shoulder land portion 4A is not provided with any groove elements 9 that have lengths in the tyre axial direction more than 15% of the maximum width Ws of the ground contacting surface 4a of the shoulder land portion 4A. This can help to reduce pumping noise generated by the groove elements 9. In the present embodiment, lengths La in the tyre axial direction of the groove elements 9 are smaller than the lengths L1, L2 and L6 in the tyre axial direction of the sipes 10, 11 and 13, respectively.

The width w2 of the groove elements 9, for example, is preferably equal to or less than 20% of the maximum width Ws of the ground contacting surface 4a of the shoulder land portion 4A. Although it is not particularly limited, a depth (not illustrated) of the groove elements 9 is preferably greater than that of the sipes 8, more preferably about 3.5 to 5.5 mm.

As illustrated in FIG. 1, each middle land portion 4B is provided with two or more sipes 20 having a width w5 less than 1.5 mm on a ground contacting surface 4b of the middle land portion 4B and two or more groove elements 21 having a width w6 equal to or more than 1.5 mm on the ground contacting surface 4b.

The sipes 20, for example, include first sipes 20a, second sipes 20b and third sipes 20c. The first sipes 20a extend from the shoulder main groove 3A toward the crown main groove 3B and terminate within the middle land portion 4B. The second sipes 20b extend from the crown main groove 3B toward the shoulder main groove 3A and terminates within the middle land portion 4B. The third sipes 20c extend from the shoulder main groove 3A toward the crown main groove 3B and are in communication with the respective groove elements 21 which extend from the crown main groove 3B.

The groove elements 21 according to the present embodiment have a length L5 in the tyre axial direction more than 15% of the maximum width Wm of the ground contacting surface 4b of the middle land portion 4B.

The crown land portion 4C according to the present embodiment is provided with two or more sipes 22 having a width w7 less than 1.5 mm on a ground contacting surface 4c of the crown land portion 4C and a groove element 23 having a width w8 equal to or more than 1.5 mm on the ground contacting surface 4c.

The sipes 22, in the present embodiment, extend inwardly in the tyre axial direction from the respective crown main grooves 3B and terminate without reaching the tyre equator C. The groove element 23, in the present embodiment, extends continuously in the tyre circumferential direction on the tyre equator C.

Figure 4:
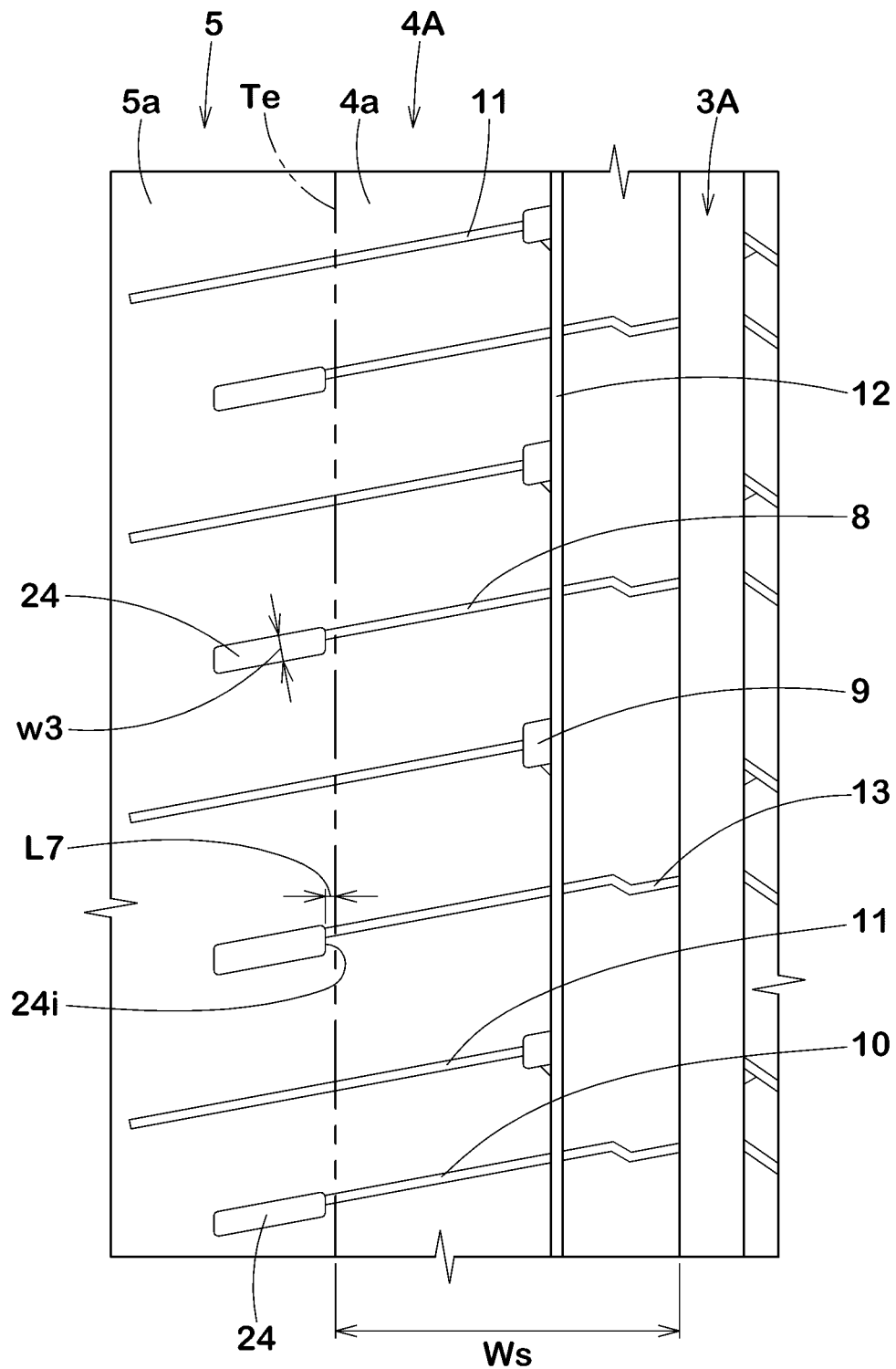
FIG. 4 is an enlarged view of the shoulder land portion according to another embodiment.

FIG. 4 illustrates an enlarged view of the shoulder land portion 4A and the buttress portion 5 according to another embodiment. Note that like reference numerals refer to the like elements or parts throughout, and that redundant description of already described elements is omitted. As illustrated in FIG. 4, in this embodiment, the buttress portion 5 is provided with two or more recesses 24 having a width w3 equal to or more than 1.5 mm on the buttress surface Sa. The recesses 24 are distinguished from the groove elements 9 on the point that they are not provided on the ground contacting surface 4a.

The first sipes 10, in this embodiment, traverse the tread edge Te and are in communication with the respective recesses 24. In this embodiment, the ground contacting surface 4a is not provided with the first groove elements 15. In this embodiment, pumping noise caused by the first groove elements 15 does not be generated. The first sipes 10, for example, connect the tread edge Te and the third sipe 12. A distance L7 in the tyre axial direction from the inner ends 24i of the recesses 24 to the tread edge Te is preferably equal to or less than 5 mm. Further, the width w3 of the recesses 24 is preferably equal to or less than 20% of the maximum width Ws of the shoulder land portion 4A.

Note that it is not limited that the groove elements 9 which have lengths in the tyre axial direction equal to or less than 15% of the maximum width of the ground contacting surface of a land portion are those provided on the shoulder land portion 4A. That is, the above-mentioned groove elements 9, for example, may be provided on the middle land portions 4B, the crown land portion 4C, or all land portions 4A to 4C.

Next, a method for manufacturing the tyre 1 as such will be explained. The method for manufacturing the tyre 1 according to the present embodiment, for example, includes forming a raw tyre 1a (shown in FIG. 5), and vulcanizing the raw tyre 1a using the tyre mold (hereinafter may be simply referred to as "mold") 30. As the forming the raw tyre 1a, a conventional method can be employed, and thus detail explanation thereof is omitted herein.

Figure 5:
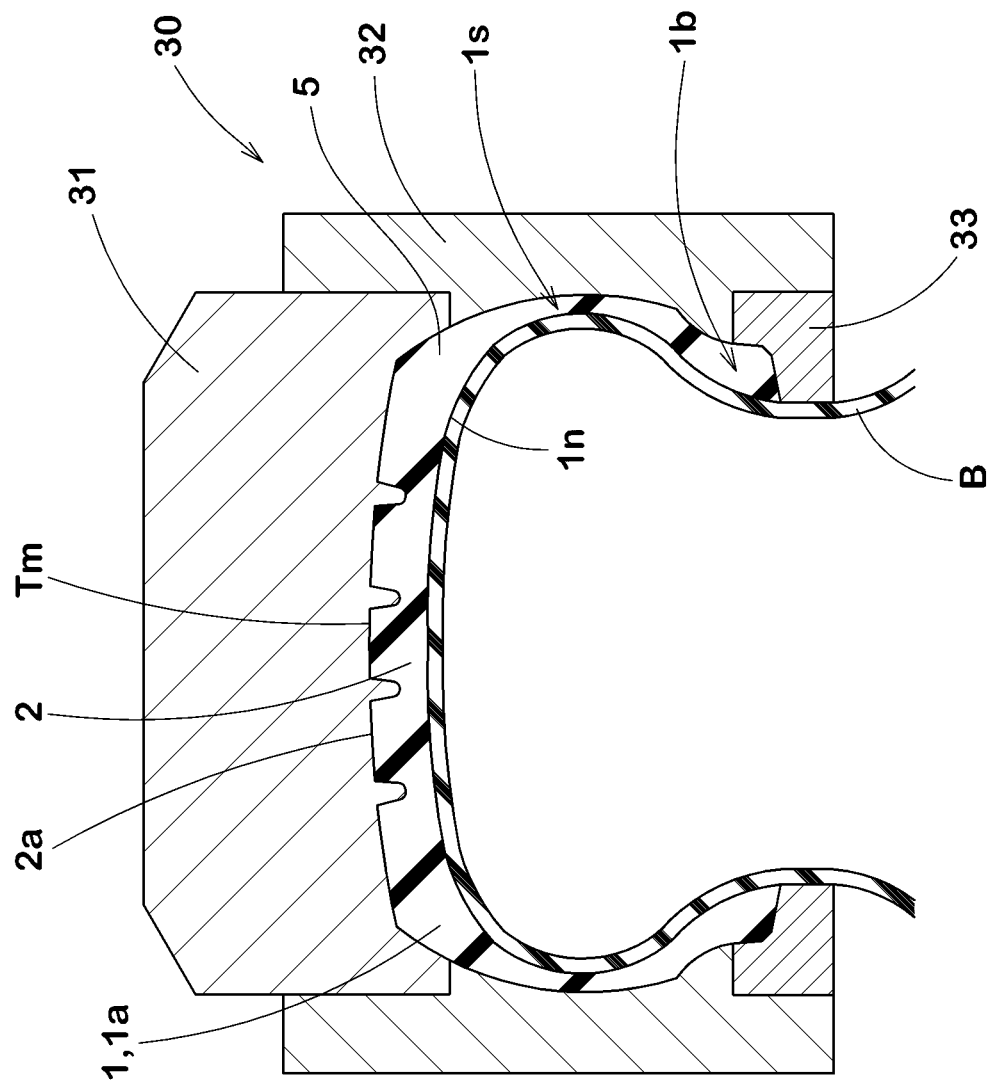
FIG. 5 is a cross-sectional view of a tyre mold taken along a tyre radial direction.

FIG. 5 illustrates a cross-sectional view of the mold 30 taken along a tyre radial direction. As illustrated in FIG. 5, the mold 30 according to the present embodiment includes a tread mold 31, a pair of sidewall molds 32, and a pair of bead molds 33. The tread mold 31, for example, can mold the tread portion 2 and a part of each buttress portion 5 of the tyre 1. The pair of sidewall molds 32 can mold a pair of sidewall portions 1s of the tyre 1. The pair of bead molds 33 can mold a pair of bead portions 1b of the tyre 1. Further, in the mold 30, a bladder B for molding an inner surface 1n of the tyre 1 is provided.

The bladder B, for example, has a bag body structure made of rubber or synthetic plastic. When vulcanizing the raw tyre 1a, the bladder B, for example, is inflated with high temperature and high pressure compressed gas or liquid, e.g., high pressure steam, thereby expanding to push the raw tyre 1a onto the mold 30.

As the sidewall molds 32 and the bead molds 33, for example, conventional structures are employed, and thus detail explanation thereof is omitted herein.

Figure 6:
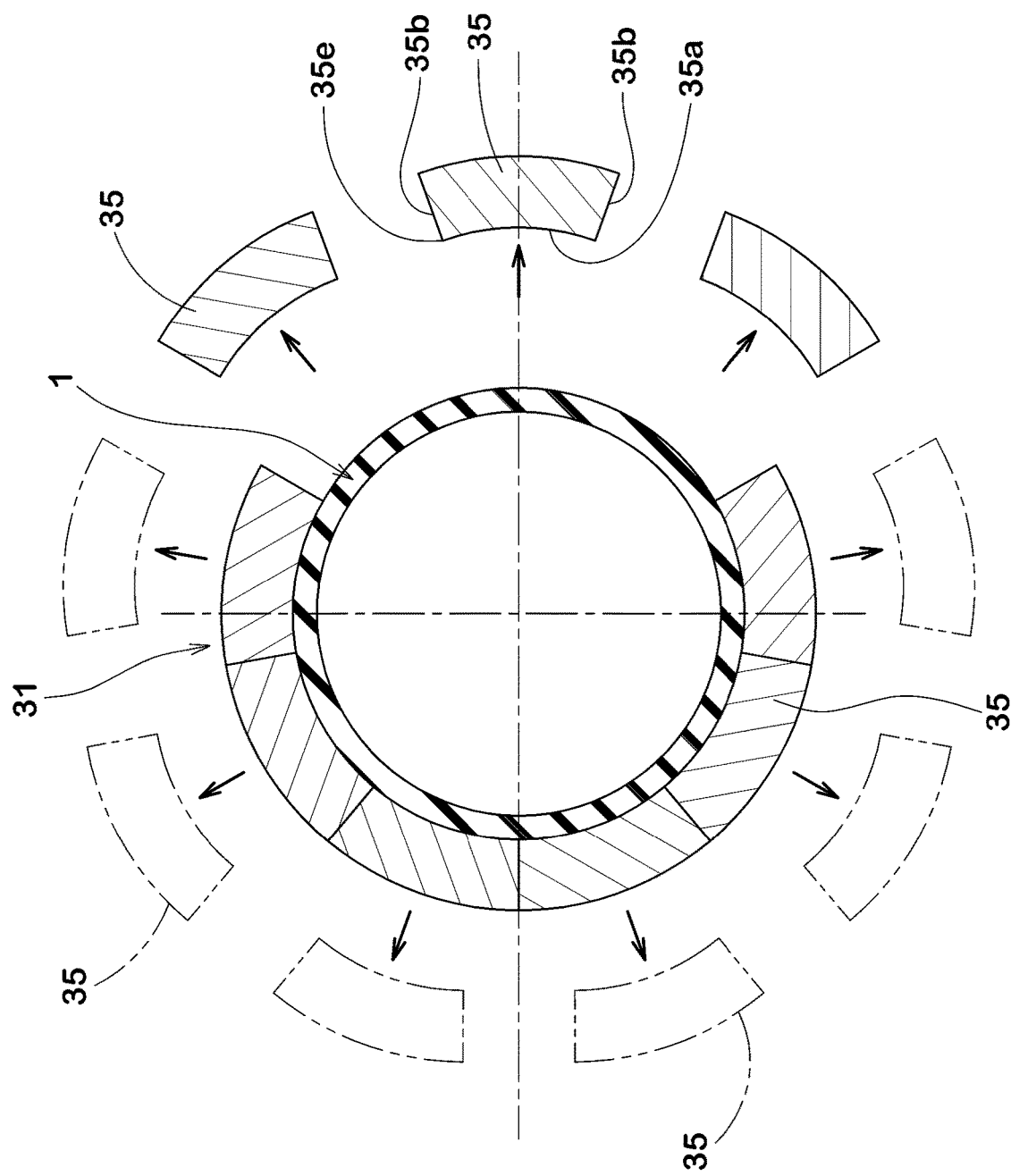
FIG. 6 is a cross-sectional view of an annular tread mold taken along a tyre circumferential direction.

FIG. 6 illustrates a cross-sectional view of the tread mold 31 taken along the tyre circumferential direction. As illustrated in FIG. 6, the tread mold 31, in the present embodiment, has an annular body in which a plurality of segments 35 is connected with one another in the tyre circumferential direction. As shown using two-dot chain lines, by moving each segment 35 outwardly in the radial direction, the tyre 1 can be taken out from the mold 30 after vulcanizing.

Each segment 35 according to the present embodiment includes a tread molding surface 35a and a pair of end faces 35b. The tread molding surface 35a can mold an outer surface Tm (shown in FIG. 5) of the tread portion 2. The pair of end faces 35b extends outwardly in the radial direction from respective ends 35e in the tyre circumferential direction of the tread molding surface 35a of the mold 30.

Figure 7:
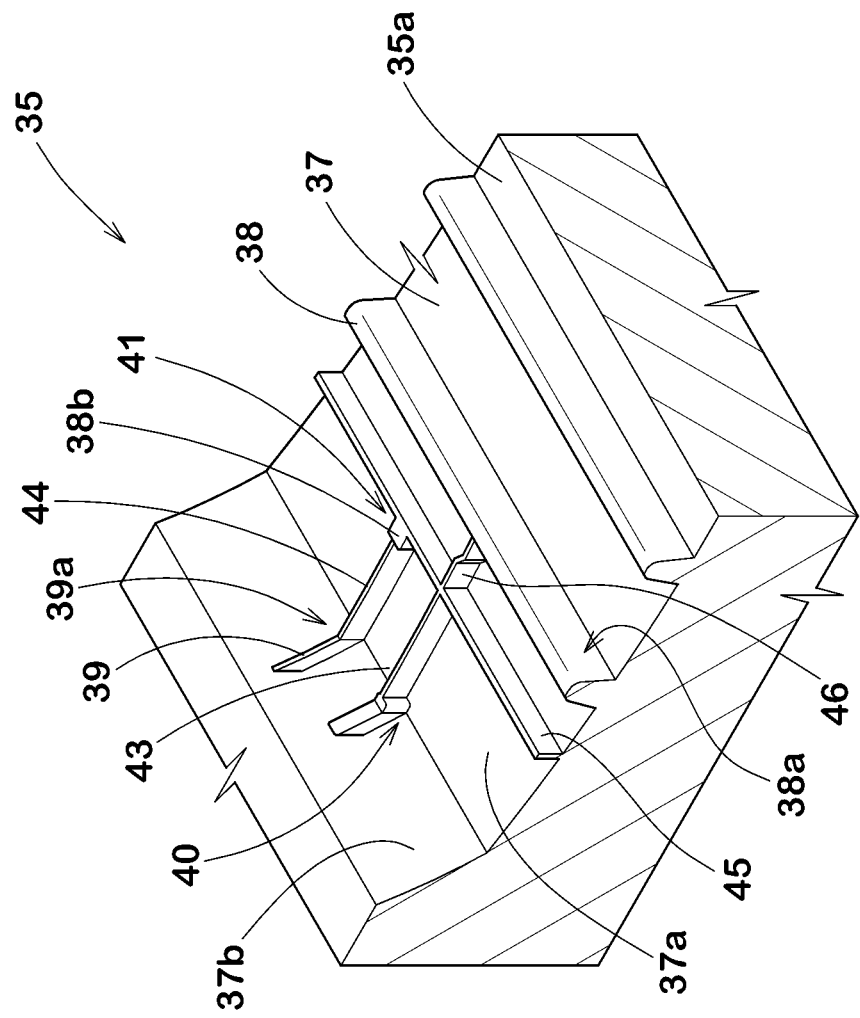
FIG. 7 is a partial perspective view of a segment.

FIG. 7 illustrates a partial perspective view of one of the segments 35. As illustrated in FIG. 7, the tread molding surface 35a according to the present embodiment includes a reference surface 37 for molding the ground contacting surface 2a (shown in FIGS. 1 and 5) of the tread portion 2, protrusions 38 protruding from the reference surface 37, and blades 39 embedded in the reference surface 37.

The reference surface 37 according to the present embodiment includes first surfaces 37a for molding the ground contacting surfaces 4a (shown in FIG. 1) of the shoulder land portions 4A, and second surfaces 37b for molding the buttress surfaces 5a and which are connected to the first surfaces 37a. The protrusions 38 according to the present embodiment include first protrusions 38a for molding the main grooves 3, and second protrusions 38b for molding the groove elements 9 of the shoulder land portions 4A. Note that the protrusions 38 may include third protrusions (not illustrated) for molding the recesses 24 (shown in FIG. 4) to be provided on the buttress portions 5. The blades 39 according to the present embodiment include shoulder blades 39a for molding the sipes 8 provided on the shoulder land portions 4A.

The second protrusions 38b according to the present embodiment includes first protrusions 40 for molding the first groove elements 15 (shown in FIG. 1), and second protrusions 41 for molding the second groove elements 16. The shoulder blades 39a according to the present embodiment include first blades 43 for molding the first sipes 10, second blades 44 for molding the second sipes 11, a third blade 45 for molding the third sipe 12, and fourth blades 46 for molding the fourth sipes 13. The fourth blades 46 may have high stiffness, reducing deformation thereof which is to be caused by tensile force upon the mold 30 is pulled away from the tyre 1.

Figure 8:
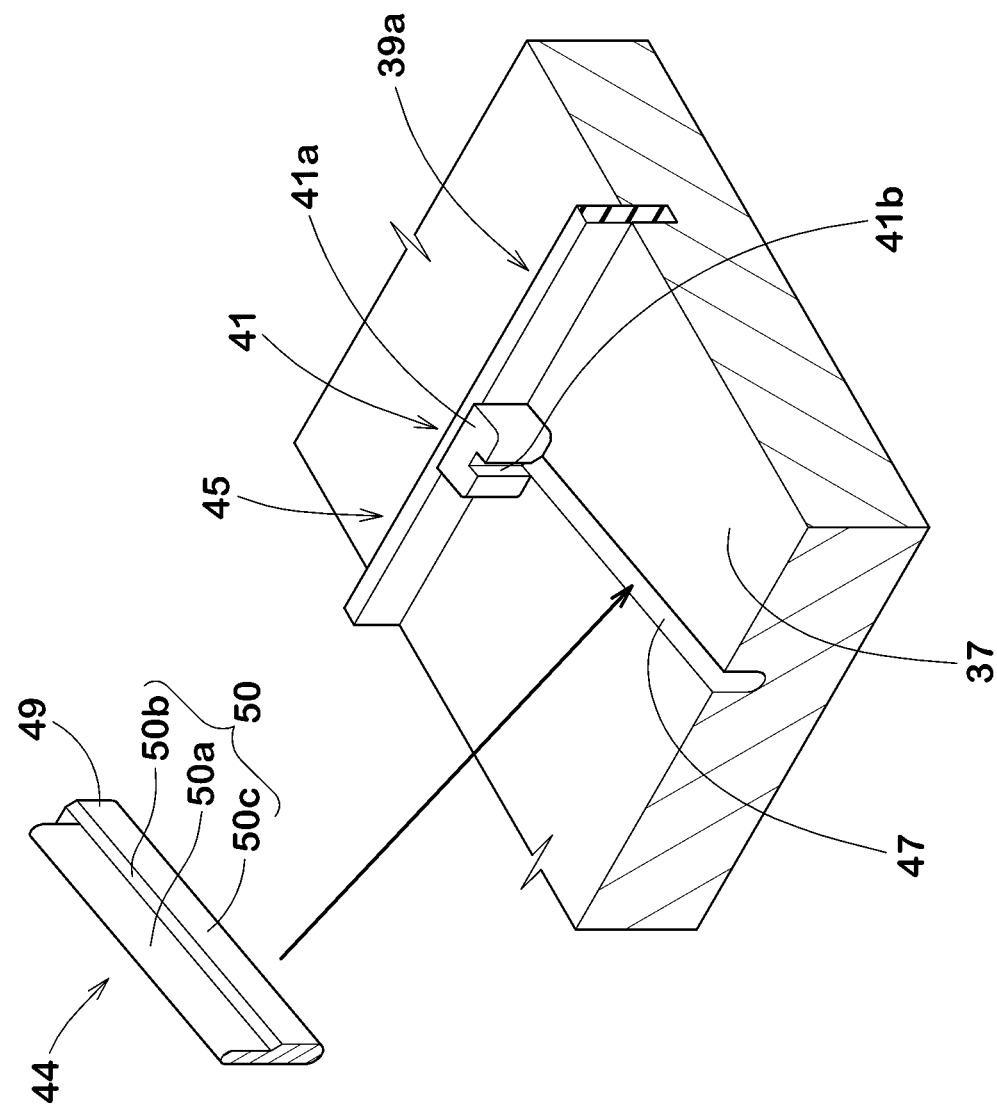
FIG. 8 is an enlarged view of a tread molding surface.

FIG. 8 illustrates a partial perspective view of one of the second protrusions 38b and one of the shoulder blades 39a. FIG. 8, as a representative, illustrates one of the second protrusions 41, one of the second blades 44, and one of the third blades 45. FIG. 8, for convenience sake, shows the second blade 44 in the state prior to it is embedded into the reference surface 37.

As illustrated in FIG. 8, the second protrusion 41, for example, is provided with a slot 41b extending from a top face 41a thereof to the reference surface 37.

Each second blade 44 according to the present embodiment includes a fixed portion 49 fixed to one of the second protrusions 41, and a main portion 50 connected to the fixed portion 49. The fixed portion 49, in the present embodiment, is fitted into the slot 41b of one of the second protrusions 41. Thus, each second blade 44 is constrained firmly in a thickness direction of the blade. Hence, when the tyre 1 is taken out from the mold 30 after vulcanizing, the second blades 44 it can be prevented from being pulled out of the reference surface 37. In order to further improve the above effect, it is preferable that the fixed portion 49 and one of the second protrusions 41, for example, are fixed by welding and the like. Note that the fixing method of the second protrusion 41 and the second blade 44 is not limited to such an embodiment.

The main portion 50 of each second blade 44, in the present embodiment, includes a sipe forming portion 50a for molding one of the sipes 8 (shown in FIG. 2), a chamfer forming portion 50b for molding one of the chamfered portions S (shown in FIG. 3), and an embedded portion 50c to be embedded into the reference surface 37. The chamfer forming portion 50b, for example, is connected to the sipe forming portion 50a, and has a radial height smaller than that of the sipe forming portion 50a. The embedded portion 50c, for example, is connected to the sipe forming portion 50a and the chamfer forming portion 50b, and is embedded into a narrow groove 47 provided on the reference surface 37.

Referring back to FIG. 7, the first blades 43 and the fourth blades 46, for example, are preferably configured so as to include fixed portions (not illustrated) and main portions as with the second blades 44. The fixed portions of the fourth blades 46, for example, may be fixed to the protrusions for forming the shoulder main grooves 3A. The third blades 45, for example, each are preferably configured so as to include a sipe forming portion (not illustrated) and an embedded portion.

While the particularly preferred embodiments in accordance with the disclosure have been described in detail above, the present disclosure is not limited to the above embodiments but can be modified and carried out in various aspects within the scope of the disclosure.

Example

Pneumatic tyres having a basic structure shown in FIG. 1 were prototyped using the tyre mold shown in FIG. 5 based on the details shown in Table 1. Then, wet braking performance, and noise performance of each test tyre was tested. The common specification of the tyres and the test procedure are as follows:
 tread width TW: 165 mm;
 widths of first groove elements (w2/Ws): 9%;
 widths of second groove elements (w2/Ws): 15%;
 widths of recesses (w3/Ws): 9%;
 widths w1 of first, second and fourth sipes: 0.8 mm;
 widths w1 of third sipes: 1.2 mm;
 tyre size: 215/65R16;
 rim size: 16×6J; and
 inner pressure (front/rear): 240/290 kPa.

Wet Braking Performance Test:
A four-wheel-drive vehicle with a displacement of 2400 cc which is equipped with test tyres on all wheels was run on a wet asphalt test course with 5 mm water depth, and then braking performance when straight driving as well as cornering was evaluated by the driver's sense. The test results are shown in Table 1 using a score, wherein Ref. 1 is set to 100. The larger value indicates better performance.

Noise Performance Test:
The four-wheel-drive vehicle which is equipped with test tyres on all wheels was run on a dry asphalt test course, and then vehicle interior noise was evaluated by the driver's sense. The test results are shown in Table 1 using a score, wherein Ref 0.1 is set to 100. The larger value indicates better performance.

The test results are shown in Table 1.

TABLE 1

|  | Ref. 1 | Ex. 1 | Ex. 2 | Ex. 3 | Ex. 4 | Ex. 5 | Ex. 6 | Ex. 7 |
|---|---|---|---|---|---|---|---|---|
| Shoulder land portion shape | FIG. 2 | FIG. 4 | FIG. 2 | FIG. 4 | FIG. 2 | FIG. 4 | FIG. 4 | FIG. 4 |
| Lengths of first groove elements L3/Ws (%) | 20 | 9 | 9 | 15 | 15 | 9 | 9 | 9 |
| Lengths of second groove elements L4/Ws (%) | 20 | — | 3 | — | 3 | — | — | — |
| Distances of recesses L3/Ws (%) | — | 3 | — | 3 | — | 3 | 3 | 3 |
| Widths of chamfered portions Ws/w1 (%) | 0 | 100 | 100 | 100 | 100 | 50 | 0 | 120 |
| Wet braking performance [score: larger is better.] | 100 | 97 | 100 | 104 | 100 | 100 | 102 | 95 |
| Noise performance [score: larger is better.] | 100 | 130 | 120 | 120 | 115 | 125 | 120 | 130 |

From the test rest results, it is confirmed that example tyres, as compared to the comparative example tyre, exhibit better noise performance while preventing reduction in wet braking performance. Further, it is also confirmed that the blades fixed to the protrusions by the fixed portions, as compared to blades which are not fixed to the protrusions, can avoid falling off thereof from the mold as well as deformation after vulcanizing.

What is claimed is:

1. A pneumatic tyre comprising:
 a tread portion being provided with a land portion divided by a main groove extending continuously in a tyre circumferential direction,
 wherein
 the land portion comprises a tread edge, the land portion is provided with two or more sipes having a width less than 1.5 mm on a ground contacting surface of the land portion and two or more groove elements having a width equal to or more than 1.5 mm on the ground contacting surface, lengths in a tyre axial direction of the groove elements are equal to or less than 15% of a maximum width in the tyre axial direction of the ground contacting surface of the land portion, at least one of the sipes is in communication with one of the groove elements, the sipes comprise at least one first sipe extending toward the tread edge, and at least one second sipe extending in the tyre axial direction, the groove elements comprise at least one first groove element in communication with the at least one first sipe, and at least one second groove element arranged inwardly in the tyre axial direction of the at least one first groove element, the at least one first groove element is arranged on the tread edge, the at least one second groove element comprises an axially outermost edge extending in parallel with the tyre circumferential direction, the at least one second groove element is in communication with the at least one second sipe, and a length in the tyre axial direction of the at least one second groove element is greater than a length in the tyre axial direction of the at least one first groove element.

2. The pneumatic tyre according to claim 1, wherein the lengths in the tyre axial direction of the groove elements are smaller than lengths in the tyre axial direction of the sipes.

3. The pneumatic tyre according to claim 1, wherein the at least one first groove element has an inner end in the tyre axial direction, and a distance in the tyre axial direction between the inner end and the tread edge is equal to or less than 5 mm.

4. The pneumatic tyre according to claim 1, wherein the sipes comprise at least one third sipe extending in the tyre circumferential direction, and the at least one second groove element is in communication with the at least one third sipe.

5. The pneumatic tyre according to claim 4, wherein the sipes comprise at least one fourth sipe extending inwardly in the tyre axial direction from the at least one third sipe, and the at least one fourth sipe is bent on the ground contacting surface of the land portion.

6. The pneumatic tyre according to claim 4, wherein a total number of the sipes provided on an outer region of the land portion between the third sipe and the tread edge is greater than a total number of sipes provided on an inner region of the land portion located inwardly in the tyre axial direction of the third sipe.

7. The pneumatic tyre according to claim 1, wherein the sipes comprise at least one third sipe extending in the tyre circumferential direction, and the at least one first sipe is in communication with the at least one third sipe.

8. The pneumatic tyre according to claim 1, wherein the land portion comprises a buttress portion extending inwardly in a tyre radial direction from the tread edge, the buttress portion is provided with two or more recesses having a width equal to or more than 1.5 mm on a buttress surface, and at least one of the first sipes is in communication with either one of the recesses.

9. The pneumatic tyre according to claim 1, wherein the sipes comprise a chamfered portion.

10. The pneumatic tyre according to claim 1, wherein the land portion is not provided with any groove elements that have lengths in the tyre axial direction more than 15% of the maximum width of the ground contacting surface of the land portion.

11. The pneumatic tyre according to claim 1, wherein all the groove elements provided on the land portion extend in a straight shape.

12. The pneumatic tyre according to claim 1, wherein the at least one first sipe and the at least one second sipe extend in a straight shape.

13. The pneumatic tyre according to claim 12, wherein the at least one first sipe and the at least one second sipe have angles equal to or less than 10 degrees with respect to the tyre axial direction.

14. The pneumatic tyre according to claim 13, wherein an absolute value of an angle difference between the at least one first sipe and the at least one second sipe is equal to or less than 5 degrees.

15. The pneumatic tyre according to claim 1, wherein the at least one second groove element comprises a portion that extends in the tyre axial direction with a groove width measured in parallel with the tyre circumferential direction being constant.

16. The pneumatic tyre according to claim 15, wherein the at least one second sipe comprises a pair of sipe edges, and the at least one second groove element comprises a pair of groove edges extending in parallel with the pair of sipe edges.

17. The pneumatic tyre according to claim 1, wherein the at least one second sipe comprises a pair of sipe edges, and the at least one second groove element comprises a pair of groove edges extending in parallel with the pair of sipe edges.

18. A pneumatic tyre comprising:

a tread portion being provided with a land portion divided by a main groove extending continuously in a tyre circumferential direction, wherein the land portion comprises a tread edge, the land portion is provided with two or more sipes having a width less than 1.5 mm on a ground contacting surface of the land portion and two or more groove elements having a width equal to or more than 1.5 mm on the ground contacting surface, lengths in a tyre axial direction of the groove elements are equal to or less than 15% of a maximum width in the tyre axial direction of the ground contacting surface of the land portion, at least one of the sipes is in communication with one of the groove elements, the sipes comprise at least one first sipe extending toward the tread edge, and at least one second sipe extending in the tyre axial direction, the groove elements comprise at least one first groove element in communication with the at least one first sipe, and at least one second groove element arranged inwardly in the tyre axial direction of the at least one first groove element, the at least one first groove element is arranged on the tread edge, the at least one second groove element comprises an axially outermost edge extending in parallel with the tyre circumferential direction, the at least one second groove element is in communication with the at least one second sipe, the sipes comprise at least one third sipe extending in the tyre circumferential direction, the at least one second groove element is in communication with the at least one third sipe, and a total number of the sipes provided on an outer region of the land portion between the third sipe and the tread edge is greater than a total number of sipes provided on an inner region of the land portion located inwardly in the tyre axial direction of the third sipe.

* * * * *